I. A. WEAVER.
PLOW.
APPLICATION FILED JAN. 2, 1912.
1,038,036.
Patented Sept. 10, 1912.
2 SHEETS—SHEET 1.
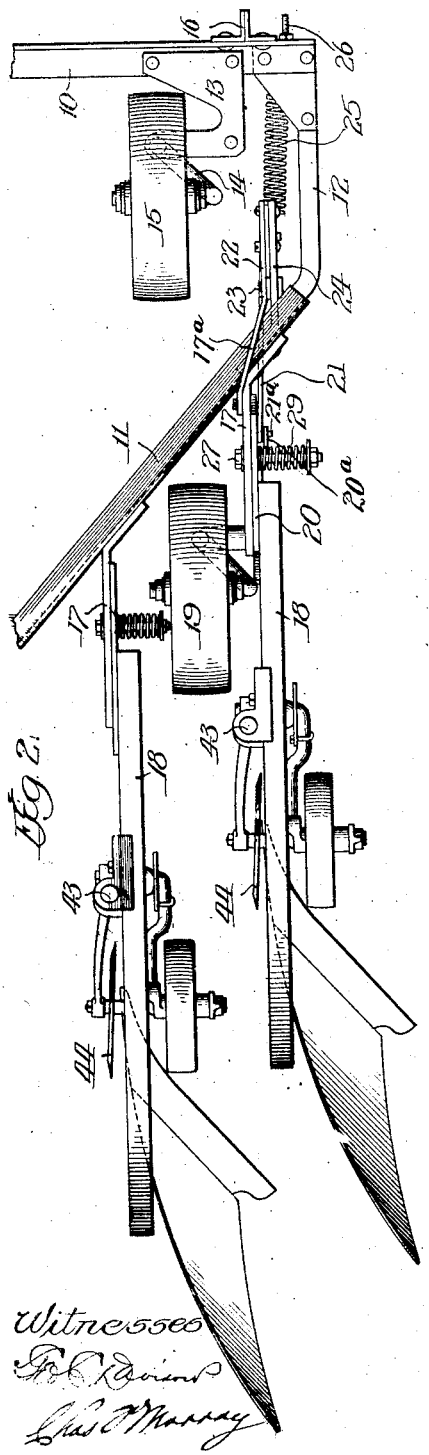
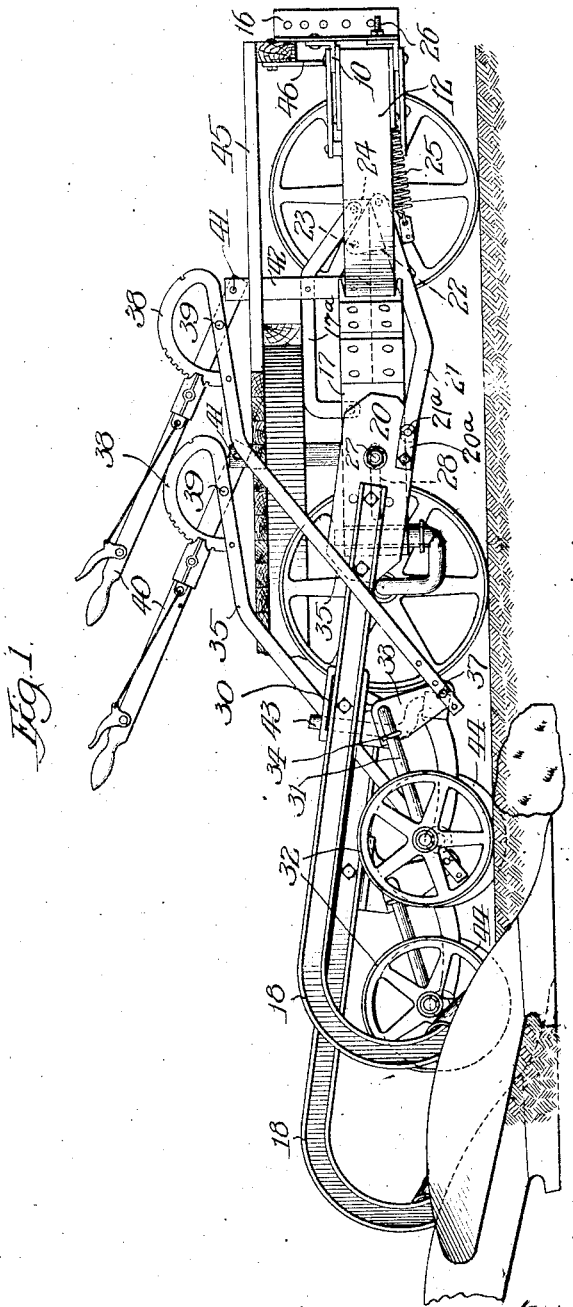

I. A. WEAVER.
PLOW.
APPLICATION FILED JAN. 2, 1912.
1,038,036.
Patented Sept. 10, 1912.
2 SHEETS—SHEET 2.
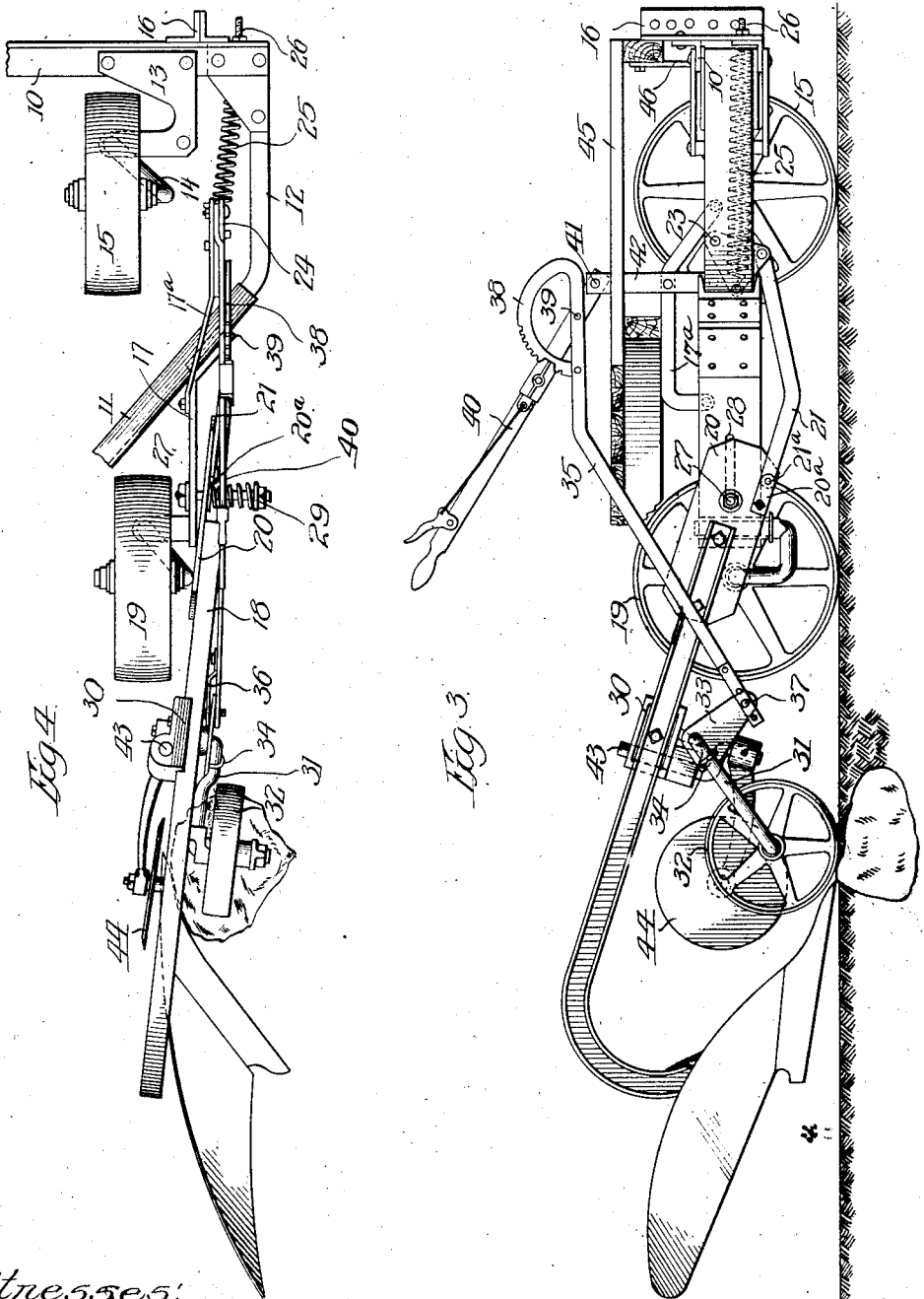
Witnesses:
Geo. C. Davison
Chas. Murray
Inventor
Ira A. Weaver
By Linthicum Belt & Fuller
Attys

UNITED STATES PATENT OFFICE.

IRA A. WEAVER, OF SPRINGFIELD, ILLINOIS, ASSIGNOR TO RACINE-SATTLEY COMPANY, OF SPRINGFIELD, ILLINOIS, A CORPORATION OF ILLINOIS.

PLOW.

1,038,036.      Specification of Letters Patent.      Patented Sept. 10, 1912.

Application filed January 2, 1912. Serial No. 668,923.

*To all whom it may concern:*

Be it known that I, IRA A. WEAVER, a citizen of the United States, and resident of Springfield, in the county of Sangamon and State of Illinois, have invented certain new and useful Improvements in Plows, of which the following is a specification.

My invention relates to plows and has particular reference to that type of plow operated in gangs and propelled by traction engines.

In the development in the art of plowing it is becoming common to employ from four to twelve plows in a gang, hauling these plows by a traction engine. In this way much more is accomplished than would be possible by the old method. However, there are many objections to the use of gangs mounted on a rigid frame, for the reason that in case one plow strikes an obstruction such as an embedded stone, the plow beam being rigidly mounted, something must break and the part to break is usually the plow point or plow beam. This, of course, necessitates the stoppage of the entire gang and causes considerable delay and loss while new parts are being secured and attached. In order to obviate these difficulties I have provided a novel mechanism by means of which solid obstructions, such as embedded rocks, are passed over or the plow is permitted to swing to escape the same. The means by which such a result is accomplished must of necessity be automatic in action inasmuch as the obstructions are usually hidden and their presence not known until the damage is done.

Therefore one of the principal objects of my invention is the provision of novel means whereby each of a plurality of independently mounted plows has automatic means associated therewith whereby solid obstructions are avoided, and furthermore, the plow at once returned into the ground at the proper depth, all without requiring attention or action on the part of the operator.

Other objects and advantages of my invention will be more fully explained hereinafter and pointed out in the claims.

My invention will be more readily understood by reference to the accompanying drawings, wherein, Figure 1 is a side elevation of a gang plow arranged in accordance with my invention; Fig. 2 is a plan view of the construction shown in Fig. 1; Fig. 3 illustrates a portion of the construction shown in Fig. 1, and shows the position assumed by the plow after contacting a solid obstruction, and Fig. 4 illustrates in plan the position assumed by one of the plows when contacting a solid obstruction, the parts being arranged so that the plow may deflect sidewise.

Referring more particularly to the drawings, it will be seen that I provide a frame composed of transverse member 10, diagonal member 11 and connecting members 12. A bracket 13 is secured to the member 10 and provides a socket within which is secured a standard 14, on which is journaled a supporting wheel 15. Angle bars 16 are also secured to the cross member 10, and provide connecting means whereby the gang is hauled by suitable tractive power. Projecting at an angle from the diagonal member 11 is a beam 17, to which the plow beam 18 is connected. This member 17 also provides a support for a further land wheel 19.

By reference to Fig. 2 it will be seen that the connection of the plow beam 18 to the frame is by springs, both in a direction parallel to the line of pull and also in a direction at right angles to the line of pull. This is accomplished in the first instance by means of a plate 20, having a bolt aperture therethrough, this plate being rigidly secured to the plow beam 18. To the lower edge of the plate 20 is secured a rigid link 21, the link being bent in order to pass beneath the diagonal member 11. The connection to the plate 20 is by means of a strap 20ª and a pin 21ª. The connection is loose in order to permit the requisite transverse movement of the plow. The forward end of this link is connected to one point of a triangular lever 22, pivoted at 23 to a bracket 24, rigidly secured to the diagonal member 11. As a further brace and support for the member 24, I provide the link 17ª, extending between the parts 17 and 24. A coil contractile spring 25 is secured by a pin to the free end of the triangular member 22, the forward end of the spring having an adjustable bolt connection 26 to the transverse member 10. Through the aperture in the plate 20 is passed a bolt 27, the bolt being adapted to coöperate with a slot 28 in the member 17. The bolt 27 is of considerable length and carries a powerful compression spring 29, the compression being adjusted by means of a washer and nut seated on the outer end of the bolt.

It will be seen that by the construction just described the plow beam will be permitted bodily movement under extreme stress, either in a rearward direction or sidewise in either direction; also that after the obstruction is passed the springs will restore the beam to its normal position; that by reason of the construction of the plate 20 and the member 17, the effect of the spring 25 is augmented because of the friction surface provided between the contacting plates. Not only this, but the effect of the spring 29 is augmented by the leverage necessary to cause the deflection of the spring as is best shown in Fig. 4.

I have heretofore described a spring mounting of my novel plow without relation to the means whereby the spring mounting is utilized to best advantage. It will be understood also that while I have described the construction in connection with only one plow, such construction is applied to each of the plows in a gang. A description of the means whereby the spring mounting is utilized will follow:

A bracket 30 is rigidly bolted to the plow beam 18, and contains a socket within which is mounted the journal of a wheel carrying member 31, to the lower end of which member is pivoted a wheel 32. Also secured to the member 31 is a lever 33, the connection being formed by means of an aperture through the lever and a loop or staple 34, which passes around the member 31. To the free end of the lever 33 is connected a link 35, which link has secured thereto a strap 36, by means of which a yoke is formed, there being a plurality of perforations 37 through the yoke in order to provide an adjustable connection between the parts. The link 35 is bent back upon itself in order to provide a segmental rack 38. The link is pivoted at 39 to an operating lever 40, the operating lever being pivoted at 41 to a member 42, projecting upwardly from the frame. The operating lever is provided with the usual ratchet mechanism by means of which the parts may be held in adjusted position. Also provided in the bracket 30 is a socket within which is mounted a standard 43, carrying at its lower end a colter 44, of well known construction. I also provide a platform 45 for the operator, this platform being mounted above the frame on the links 46, as shown in Figs. 1 and 3.

The operation of my novel plow is as follows: Assuming a gang of plows in operation and in the position of Fig. 1, if one of the plows strikes an immovable object such as the concealed rock shown in that view, it will be seen that the plow must in some manner escape the obstruction. This is accomplished because of the fact that the spring connection between the plow and the frame permits the plow to be arrested while the remainder of the plows and the frame proceed onward. This is permitted to the extent of the slot 28 in the member 17. However, the link 35, being rigidly secured to a portion of the frame, proceeds onward with the frame while the lever 33, carrying the wheel 32, being arrested with the plow beam, is caused to turn and the wheel 32 to be advanced with and at a faster rate of speed than the plow frame. The wheel 32 being pivoted on the arm 31, which normally extends rearwardly at an angle to the horizontal, is caused to assume a more vertical position and, in assuming such vertical position, the plow beam is of necessity elevated or swung on its pivoting bolt 27. The forward end of the beam being held against vertical movement, the rear end which supports the plow is raised clear of the ground and as soon as free from the retarding influence is sprung forward under the action of the spring 25 and at once enters the ground to its normal depth. Assuming, however, that the plow strikes an obstruction on its side, that is, that the point does not directly contact the obstruction, it will be seen by reference to Fig. 4 that the plow beam and all of its associated parts are permitted sidewise deflection as well as rearward movement, due to the spring 29 and the normally contacting plates 20 and 17. It may occur, as illustrated in Fig. 4, that the plow will simultaneously rise and be deflected sidewise, in this way securing the benefit of both motions.

All the actions heretofore described are entirely automatic and require no attention whatever on the part of the operator. Of course, if a plow is to be elevated for any reason the operator actuates the lever 40, thus causing an action somewhat similar to that which takes place on the contact of a plow with an obstruction. It is obvious also that the depth to which the plow enters the ground is regulated by the same lever and that after such regulation the action is entirely automatic.

The mechanisms herein described are only typical of many others which might be devised for securing the same results and I do not therefore wish to be limited to the exact construction herein shown and described.

I claim:

1. In a device of the character described, the combination of a frame, a plow beam, a plow carried by said beam, and a spring connection between said beam and frame, whereby longitudinal and transverse movement of the plow relative to said frame is permitted, substantially as described.

2. A device of the character described comprising, in combination, a frame, a plow beam, a plow on said beam, a spring connection between said frame and said beam whereby limited relative longitudinal and transverse movement between said frame and beam is permitted, and means mounted on said beam and connected to said frame, whereby the elevation of said beam is caused by the relative separation of said frame and beam, substantially as described.

3. A device of the class described comprising, in combination, a frame, a plow beam, a plow carried by said beam, a spring connection between said beam and said frame, whereby relative longitudinal movement between said beam and frame is permitted and a second spring connection between said beam and said frame, adapted to act at substantially a right angle to said first mentioned spring, whereby transverse movement of said plow beam is permitted, substantially as described.

4. A device of the character described comprising, in combination, a frame, a plow beam, a plow secured to said beam, a connection between said beam and said frame, whereby limited relative movement between said beam and frame is permitted, said connection including a spring, and a second spring associated with said connection means, said second spring being arranged to permit sidewise movement of said plow and beam, substantially as described.

5. A device of the class described comprising, in combination, a frame, a plow beam, a plow carried by said beam, a spring connection between said beam and said frame, whereby relative longitudinal movement between said beam and frame is permitted, a second spring connection between said beam and said frame and located to the rear of said first mentioned spring, whereby transverse movement of said plow beam is permitted, and means coöperating with the spring connection between said frame and beam and adapted to automatically cause the elevation of said plow and beam when said plow contacts an obstruction, substantially as described.

6. A device of the character described comprising, in combination, a frame, a plow beam, a plow secured to said beam, a connection between said beam and said frame, whereby limited relative movement between said beam and frame is permitted, said connection including a spring, a second spring associated with said connecting means, said second spring being arranged to permit sidewise movement of said plow and beam, and means coöperating with the spring connection between said frame and beam and adapted to cause the elevation of said plow and beam when said plow contacts an obstruction, substantially as described.

7. A device of the class described comprising, in combination, a frame, a plow beam, a plow associated with said beam, a connection between said plow beam and said frame, whereby universal movement is permitted, springs normally maintaining said plow beam in proper operative relation to said frame, and a shiftable wheel mounted on said beam and having a connection to said frame whereby said wheel is shifted and said beam elevated upon the relative separation of said beam and frame, substantially as described.

IRA A. WEAVER.

Witnesses:
FRANK H. OFFER,
JOHN F. McLERMAN.